(12) United States Patent
Gehrig et al.

(10) Patent No.: US 7,858,138 B2
(45) Date of Patent: Dec. 28, 2010

(54) METHOD FOR DECAFFEINATING TEA

(75) Inventors: Manfred Gehrig, Wolnzach (DE); Stefan Geyer, Wolnzach (DE); Josef Schulmeyr, Wolnzach (DE); Birgit Forchhammer, Neustadt (DE); Karin Simon, Pfaffenhofen (DE)

(73) Assignee: NATECO2 GmbH + Co. KG, Wolznach (DE)

( * ) Notice: Subject to any disclaimer, the term of this patent is extended or adjusted under 35 U.S.C. 154(b) by 1025 days.

(21) Appl. No.: 11/631,887

(22) PCT Filed: Jul. 8, 2005

(86) PCT No.: PCT/EP2005/007407

§ 371 (c)(1),
(2), (4) Date: Jan. 8, 2007

(87) PCT Pub. No.: WO2006/005537

PCT Pub. Date: Jan. 19, 2006

(65) Prior Publication Data

US 2007/0231445 A1    Oct. 4, 2007

(30) Foreign Application Priority Data

Jul. 9, 2004    (DE) .......... 10 2004 033 382

(51) Int. Cl.
  *A23F 3/36*    (2006.01)
(52) U.S. Cl. .......... 426/597; 426/478; 426/427; 426/425; 426/481
(58) Field of Classification Search .......... 426/597, 426/478, 427, 425, 481
See application file for complete search history.

(56) References Cited

U.S. PATENT DOCUMENTS

| | | | | |
|---|---|---|---|---|
| 3,843,824 A | * | 10/1974 | Roselius et al. | 426/386 |
| 3,879,569 A | * | 4/1975 | Vitzthum et al. | 426/427 |
| 4,167,589 A | * | 9/1979 | Vitzthum et al. | 426/312 |
| 4,251,559 A | * | 2/1981 | Margolis et al. | 426/490 |
| 4,255,458 A | | 3/1981 | Roselius et al. | |
| 4,255,461 A | * | 3/1981 | Jasovsky et al. | 426/595 |
| 4,260,639 A | * | 4/1981 | Zosel | 426/478 |
| 4,276,315 A | * | 6/1981 | Katz et al. | 426/428 |
| 4,322,445 A | * | 3/1982 | Peter et al. | 426/312 |
| 4,328,255 A | * | 5/1982 | Roselius et al. | 426/417 |
| 4,341,804 A | * | 7/1982 | Prasad et al. | 426/387 |
| 4,411,923 A | * | 10/1983 | Hubert et al. | 426/271 |
| 4,466,923 A | | 8/1984 | Friedrich | |
| 4,472,442 A | * | 9/1984 | Katz | 426/428 |
| 4,728,525 A | * | 3/1988 | Toro et al. | 426/481 |
| 4,767,634 A | * | 8/1988 | Kaleda et al. | 426/271 |
| 4,880,656 A | * | 11/1989 | Schutz et al. | 426/386 |
| 4,911,941 A | * | 3/1990 | Katz et al. | 426/427 |
| 4,938,977 A | | 7/1990 | Gehrig et al. | |
| 4,951,557 A | * | 8/1990 | Reich | 99/281 |
| 4,976,979 A | * | 12/1990 | Klima et al. | 426/427 |
| 5,087,468 A | * | 2/1992 | Schulmeyr | 426/386 |
| 5,135,766 A | * | 8/1992 | Hermsen et al. | 426/427 |
| 5,153,015 A | * | 10/1992 | Theissing et al. | 426/427 |
| 5,266,342 A | * | 11/1993 | Spence et al. | 426/422 |
| 5,288,511 A | * | 2/1994 | Kazlas et al. | 426/427 |
| 5,338,575 A | * | 8/1994 | Ben-Nasr et al. | 426/427 |
| 5,702,747 A | * | 12/1997 | Sipos et al. | 426/422 |
| 5,932,101 A | | 8/1999 | Kanel et al. | |

FOREIGN PATENT DOCUMENTS

| | | |
|---|---|---|
| DE | 2127642 | 4/1973 |
| DE | 2637197 | 2/1978 |
| DE | 3413869 | 10/1985 |
| DE | 3415844 | 10/1985 |
| DE | 3414767 | * 11/1985 |
| DE | 3443390 | 5/1986 |
| DE | 3640333 | 6/1988 |
| DE | 3719991 | * 12/1988 |
| DE | 3817736 | 11/1989 |
| DE | 3838952 | 5/1990 |
| DE | 4400096 | 7/1995 |
| DE | 195 24 481 | 1/1997 |
| JP | 1 289 448 | 11/1989 |
| JP | 5-219889 | * 8/1993 |

OTHER PUBLICATIONS

International Search Report.

* cited by examiner

*Primary Examiner*—Anthony Weier
(74) *Attorney, Agent, or Firm*—Bucknam and Archer

(57) ABSTRACT

The invention relates to a method for decaffeinating tea (*Camellia sinensis*). The method involves of using, as an extraction agent, a carbon dioxide which is compressed of a pressure greater than 50 and up to 100 MPa.

5 Claims, No Drawings

METHOD FOR DECAFFEINATING TEA

CROSS REFERENCE TO RELATED APPLICATIONS

Applicants claim priority under 35 U.S.C. §119 of German Application No. 10 2004 033 382.3 filed Jul. 9, 2004. Applicants also claim priority under 35 U.S.C. §365 of PCT/EP2005/007407 filed Jul. 8, 2005. The international application under PCT article 21(2) was not published in English.

The invention relates to a method for decaffeinating tea as well ad to decaffeinated tea prepared according to this method.

Infusions of coffee or tea are, due to their taste and stimulating properties, prevalent and popular beverages. For consumers who would like to avoid taking caffeine for reasons of health or other reasons, decaffeinated coffee and tea have been available for a long while.

Decaffeination is carried out by solvent extraction wherein for the production of decaffeinated coffee (*coffea* spp.) the green beans are extracted. Since the relevant aroma substances do not originate before the subsequent roasting procedure, the extraction step is less critical for the quality of the final product. With tea (*Camellia sinensis*) other conditions prevail. Generally, tea is subjected to decaffeination in its final form, i.e. as steamed or roasted green tea or as fermented black tea, so that the extraction step is critical for the quality of the final product. For, in case the extraction is not selective enough, the tea will be deprived of many flavor and fragrance substances and, therefore, will-lose values of palatability.

For tea, supercritical carbon dioxide is at present used in most cases as a means of decaffeination, which, dependent on the extraction parameters applied, possesses relatively selective extraction properties. Nevertheless, it was at first deemed necessary to start, in a three-step-process (DE 21 27 642 Studiengesellschaft Kohle), with extracting aroma substances with dry carbon dioxide, then to remove the caffeine with humid $CO_2$ and finally to re-impregnate the tea with the aroma extraced before. Decaffeination was carried out at a pressure of 20 to 25 MPa. This complicated way of proceeding could not succeed, because, by the multiple treating steps necessary, the very sensitive tea aroma is impaired so that the result is not better than with a simple extraction step. A likewise multi-step process is known from DE 26 37 197 (HAG AG), which process provides for a selective separation of the caffeine extracted, carried out by passing the extract over ion exchangers without a preceding reduction of pressure. The pressure preferably amounts to 10 to 30 MPa.

Later, decaffeinated tea of satisfactory quality has been prepared by single-step extraction procedures. Thus, from DE 34 15 844 (SKW Trostberg AG) a process is known in which the extraction is carried out with supercritical carbon dioxide at a pressure of from 26 to 35 MPa and a temperature of from 50 to 70° C., and the caffeine extracted is bound to activated carbon. According to DE 34 13 869 (Hopfenextraktion HVG Barth) $CO_2$ in a liquid state, i.e. below its critical temperature but above its vapor pressure is used at a pressure of up to 40 MPa.

In further decaffeination processes for tea the problem of preserving the aroma is picked up. Thus, from DE 36 40 333 and DE 38 17 736 (Hopfenextraktion HVG Barth) two-stage extraction processes are known in which the aroma withdrawal occurs under milder conditions than the subsequent decaffeination does, which is carried out at a pressure of from 15 to 40 MPa (15 to 50 MPa according to U.S. Pat. No. 4,938,977). A different way is pursued according to DE 44 00 096 (Hopfenextraktion HVG Barth): In a single-step process the caffeine is selectively removed from the carbon dioxide circulating in the extraction circuit by a washing process which is carried out with water.

Apart from the flavor problem, economic considerations were the center of the development of the state of the art. For decaffeination considerable amounts of carbon dioxide in relation to the tea employed are necessary, the provision of which requires large pumps, long extraction times and a high energy input, especially when the separation of the caffeine occurs by lowering the pressure. Long extraction times will become necessary, because the tea leaves or the small tea particles, when humid, do not admit unlimitedly high flow velocities during extraction. Since the caffeine is complexed with components as polyphenols, only about 10 to 20% of the solubility of free caffeine are achieved for these complexes during decaffeination, so that, in order to obtain a complete decaffeination of tea, amounts of $CO_2$ on the order of 200 to 300 kg per kg of tea have to be circulated through the material to be extracted.

Therefore, attempts were made to reduce the necessary amounts of gas by increasing the solubility of the caffeine by addition of so-called carriers (modifiers) to the carbon dioxide. Examples of such processes have been known from U.S. Pat. No. 4,255,458 (HAG AG) and JP A 01 289 448 (Ube Ind. Ltd.). It is common to such processes that carrying out the process is admittedly possible with smaller amounts of $CO_2$, however, higher losses of valuable aroma substances are caused thereby, which renders the tea which has been decaffeinated in this way inferior with respect to quality. The economic advantages of these processes are, by the way, counterbalanced by the necessary provision and regeneration of the modifier.

According to the state of the art, the decaffeination of tea with carbon dioxide occurs at a pressure of 20 to 40 MPa. Considerations regarding quality determine the temperature applied in such a way that a higher temperature in some cases, on the one hand, permits an economically more advantageous decaffeination while it is, on the other hand, accompanied with disadvantages regarding quality.

With respect to the application of higher pressures there existed a prejudice in that, on the one hand, no substantial acceleration of the extraction process was expected while, on the other hand, it had to be feared that the sensitive aroma substances be impaired or at least be more intensely extracted and, thus, be lost. In DE 34 13 869 it is additionally mentioned that there is an upper limit for technical (apparatuses)—and, therefore, economical—reasons lying at about 40 MPa.

Even for the majority of the natural substances that are commercially extracted with carbon dioxide, with the exception of the triglycerides contained in oil seeds, there is a rule saying that the application of pressures of already over 30 MPa will, on the one hand, accelerate the extraction only insignificantly. On the other hand, it will cause higher investment costs by the higher compressive strength necessary for the apparatuses, units and pipelines and by higher energy expenses because of higher pressure differences during extraction work. By contrast, it is known to advantageously carry out the extraction of fats and oils at pressures of above 55 MPa (e.g. U.S. Pat. No. 4,466,923). However, there is no chemical relationship between triglycerides, i.e. fats and oils, and the alkaloid caffeine. A significant advantage of a decaffeination process carried out at a pressure of above 50 MPa could, therefore, not be expected. Consequently, for this reason obviously no research was undertaken in this direction.

Subject matter of the invention is the process described in claim 8. Advantageous embodiments of this process will become evident from the subclaims 9 to 12. Subject matter of the invention is, moreover, decaffeinated tea of the plant *Camellia sinensis*, obtained by said process.

The present invention relates to a decaffeination process for all kinds of tea of the plant *Camellia sinensis*, as green tea, oolong tea or black tea. The extraction of the caffeine is carried out with carbon diocide at an extraction pressure of above 50 MPa up to 100 MPa and at a temperature of 10 to 80° C. For it has surprisingly been found that by observing such conditions the amount of $CO_2$, based on the amount of tea, can be reduced by more than 50% in relation to the state of art, which constitutes an important economic benefit because the throughput of tea of a commercial plant is, thereby, considerably increased (possibly more than doubled). The additional expenditure necessary for installing of components being capable of withstanding the higher pressure, will thereby more than compensated for. Especially preferred are extraction conditions of a pressure of 60 to 100 MPa, more preferably 70 to 95 MPa, and of a temperature of 60 to 75° C.

It has further been found that a tea that was decaffeinated according to the conditions of the invention can, with respect to its sensorial quality, be equated with a tea that was decaffeinated according to the conditions applied by the state of art and cannot be distinguished from the latter with respect to taste, smell and color. For, the important polyphenolic ingredients epigallo-catechin gallate and epicatechin gallate are, surprisingly, not dissolved even at the high extraction pressure.

The process according to the invention is carried out as follows, leaving a certain range for optimizing to the expert: Prior to the decaffeination the tea is humidified with water to a water content of from 12 to 50% and filled into a suitable pressure tank, which is pressurized to the desired extraction pressure with food grade carbon dioxide from a supply tank by means of a pump, and the carbon dioxide is continuously circulated through the extraction tank during the required extraction time. For separating the caffeine from the carbon dioxide, there are several possibilities. Especially two procedures come into question. In one of them, the caffeine is almost completely or, in fact, completely removed from the carbon dioxide by a pressure reduction to the low supercritical or subcritical range, i.e. to a pressure of 15 to 5 MPa, while the carbon dioxide is subsequently re-pressurized to the extraction pressure. The second process provides for circulating the carbon dioxide without any substantial pressure reduction, the caffeine being selectively bound to an adsorbent as activated carbon, silica gel, an absorber resin or an ion exchanger having functional groups. During extraction, it is advantageous to keep the water content at the value to which it had been adjusted in the beginning, to which end an addition of water to the carbon dioxide may be necessary, before it enters the extracting tank.

Further possible processes for removing the caffeine from the circuit are the washing of the carbon dioxide with water while retaining the extraction pressure or the restraint of the caffeine by a membrane that is permeable for carbon dioxide only.

After extraction the extracting tank is depressurized and the tea is taken out and dried.

For the technical configuration of an extraction plant the possibilities of the state of art can be used. A commercial plant will generally consist of several extractors, being streamed through simultaneously or alternately in series or in parallel, in order to be able to extract a maximum amount of caffeine per unit time. Such extraction plants are common to the expert. An example thereof is the decaffeination cycle described together with the plant belonging thereto (in addition to the dearomatization cycle) in U.S. Pat. No. 4,938,977 the contents of which are herewith explicitly made part of the disclosure of the present invention.

EXAMPLES

The kinds of tea indicated below were extracted with carbon dioxide in a small production plant having an effective extraction volume of 50 liters under the process parameters given likewise below. The separation of the caffeine from the carbon dioxide was caused by reducing the pressure in the separation vessel. The circulated carbon dioxide was added with water prior to the entry into the extraction vessel in order to replace the amount separated in the extraction vessel and separation vessel resp. by the solubility differences at the different pressure levels. The results of the decaffeination for the following examples are summarized in tables.

Example 1

| Sort "Kenya" (black tea), starting content of caffeine: 3.1 weight % | | | |
|---|---|---|---|
| | Comparative example 1a | Comparative example 1b | Example 1 |
| Extraction pressure, bar | 300 | 300 | 800 |
| Extraction temperature, ° C. | 66 | 66 | 66 |
| Humidity content, weight % | 26 | 26 | 26 |
| Relative amount of solvent, kg/kg tea | 260 | 105 | 105 |
| Residual caffeine content, weight % | 0.22 | 0.58 | 0.15 |

Example 2

| Sort "China-Green" (green tea), starting content of caffeine: 2.9 weight % | | | |
|---|---|---|---|
| | Comparative example 2a | Comparative example 2b | Example 2 |
| Extraction pressure, bar | 300 | 300 | 900 |
| Extraction temperature, ° C. | 66 | 66 | 66 |
| Humidity content, weight % | 26 | 26 | 26 |
| Relative amount of solvent, kg/kg tea | 260 | 95 | 95 |
| Residual caffeine content, weight % | 0.15 | 1.11 | 0.04 |

The invention claimed is:

1. Process for the decaffeination of tea of the plant *Camellia sinensis* by extraction with carbon dioxide and subsequent separation of the caffeine from the carbon dioxide charged therewith, wherein the extraction is carried out at a pressure from 60 to 100 MPa and a temperature of from 10 to 80° C.

2. Process according to claim 1, wherein the extraction is carried out a pressure of from 70 to 95 MPa.

3. Process according to claim 1, wherein the tea is adjusted for the decaffeination to a humidity of 12 to 50%.

4. Process according to claim 1, wherein the caffeine is separated from the carbon dioxide by reducing the pressure to a value of 15 MPa or below.

5. Process according to claim 1, wherein the caffeine is separated from the carbon dioxide by adsorption.

* * * * *